United States Patent
Abeyta et al.

(10) Patent No.: US 10,540,875 B2
(45) Date of Patent: Jan. 21, 2020

(54) EMERGENCY RESPONSE SYSTEM

(71) Applicant: Allwater Marine Group, LLC, Mount Pleasant, SC (US)

(72) Inventors: Joseph B. Abeyta, Mount Pleasant, SC (US); William C Walsh, Jr., Tybee Island, GA (US)

(73) Assignee: Allwater Marine Group, LLC, Mount Pleasant, SC (US)

( * ) Notice: Subject to any disclaimer, the term of this patent is extended or adjusted under 35 U.S.C. 154(b) by 934 days.

(21) Appl. No.: 15/040,839

(22) Filed: Feb. 10, 2016

(65) Prior Publication Data

US 2016/0232773 A1    Aug. 11, 2016

Related U.S. Application Data

(60) Provisional application No. 62/114,283, filed on Feb. 10, 2015.

(51) Int. Cl.
    *G08B 21/04* (2006.01)
    *H04L 12/58* (2006.01)

(52) U.S. Cl.
    CPC ......... *G08B 21/0423* (2013.01); *G08B 21/04* (2013.01); *G08B 21/043* (2013.01); *G08B 21/0415* (2013.01); *H04L 51/046* (2013.01); *H04L 51/14* (2013.01)

(58) Field of Classification Search
    CPC ............... G08B 21/04; G08B 21/0415; G08B 21/0423; G08B 21/043
    See application file for complete search history.

(56) References Cited

U.S. PATENT DOCUMENTS

| | | | | |
|---|---|---|---|---|
| 7,047,203 B2* | 5/2006 | Johnson | ................ | G06Q 10/10 705/325 |
| 7,312,712 B1* | 12/2007 | Worrall | ................ | G06Q 10/06 340/573.4 |
| 7,620,562 B2* | 11/2009 | Henry | ............ | G06Q 10/06314 705/7.21 |

(Continued)

OTHER PUBLICATIONS

"About HikerAlert.com", Aug. 12, 2013, web page archived at https://web.archive.org/web/20130812130932/http://www.hikeralert.com/about (Year: 2013).*

(Continued)

*Primary Examiner* — Aaron N Strange
(74) *Attorney, Agent, or Firm* — Mark Terry

(57) ABSTRACT

A server application that includes a receiving module for receiving a plurality of user information from a first mobile computing device, including a user name, user contact information, a plan having an end time and plan location, an emergency contact name, emergency contact information and a list of estimated emergency services required by the user in case of an emergency. The application includes an initiation module for reading the user information, creating a user record, and storing it in an attached database. A transmitting module detects the end time of the plan, then generates and sends a first message to the user. If the user does not respond, a transmitting module generates and sends a second message to the emergency contact. If the emergency contact does not respond, a transmitting module sends a third message to an emergency response organization requesting estimated emergency response services.

12 Claims, 12 Drawing Sheets

(56) References Cited

U.S. PATENT DOCUMENTS

| | | | | |
|---|---|---|---|---|
| 7,629,891 B1* | 12/2009 | Bell | ............... | G06Q 10/02 340/506 |
| 8,086,398 B2* | 12/2011 | Sanchez | ............... | G01C 11/34 701/517 |
| 8,471,699 B2* | 6/2013 | Kornbluh | ............... | G06Q 50/28 340/332 |
| 2002/0107927 A1* | 8/2002 | Gallant | ............... | G08B 21/0423 709/206 |
| 2008/0311880 A1* | 12/2008 | Copley, III | ............... | G06Q 10/107 455/404.1 |
| 2010/0323658 A1* | 12/2010 | Lagergren | ............... | G01C 21/20 455/404.2 |
| 2011/0145822 A1* | 6/2011 | Rowe | ............... | G06Q 10/10 718/100 |
| 2011/0175724 A1* | 7/2011 | Kent | ............... | G06Q 10/06 340/539.13 |
| 2011/0279263 A1* | 11/2011 | Rodkey | ............... | G08B 25/016 340/539.13 |
| 2011/0294457 A1* | 12/2011 | Braznell | ............... | G08B 21/0227 455/404.1 |
| 2012/0246089 A1* | 9/2012 | Sikes | ............... | H04M 1/72536 705/325 |
| 2013/0065569 A1* | 3/2013 | Leipzig | ............... | G06F 9/453 455/416 |
| 2013/0069802 A1* | 3/2013 | Foghel | ............... | G08G 1/205 340/989 |
| 2014/0146171 A1* | 5/2014 | Brady | ............... | H04N 7/188 348/143 |
| 2014/0323079 A1* | 10/2014 | Paolini | ............... | G08B 25/016 455/404.2 |
| 2016/0067547 A1* | 3/2016 | Anthony | ............... | G01P 15/0891 702/141 |

OTHER PUBLICATIONS

"HikerAlert Sample Report", Aug. 20, 2013, web page archived at https://web.archive.org/web/20130820001928/http://www.hikeralert.com:80/sample-alert/ (Year: 2013).*

Bob Parks, "What's the Best Way to Share My Emergency Info?", Jun. 20, 2013, Outside Online, web page available at: https://www.outsideonline.com/1776851/whats-best-way-share-my-emergency-info (Year: 2013).*

* cited by examiner

FIG. 5L

EMERGENCY RESPONSE SYSTEM

CROSS REFERENCE TO RELATED APPLICATIONS

This patent application claims priority to provisional application No. 62/114,283, filed on Feb. 10, 2015 and titled "Emergency Response System." Provisional application No. 62/114,283 is hereby incorporated by reference in its entirety.

TECHNICAL FIELD

The disclosed embodiments relate generally to the field of emergency response systems and, more specifically, the disclosed embodiments relate to a system for notifying emergency response personnel in case of an emergency.

BACKGROUND

In many cases, when a traveler embarks on a journey or trip to a remote geographical area, such as to remote bodies of water (i.e., an, ocean, sea or lake), the mountains or in the wilderness, such traveler may not have immediate access to individuals who can provide emergency services in case of an emergency. In the past, if a traveler desired safety measures, the person night notify an individual in a populated area of his travel plan, including the destination and estimated arrival time at the destination, in case the traveler does not return safely. Unfortunately, this approach requires the individual being notified to remember the end-time of the travel plan. Additionally, this also requires the individual to then have accurate information to pass on to emergency response organizations and personnel in the event the traveler does not return safely. Another problem occurs when the individual responsible for notifying the emergency response organizations does not timely notify the authorities. Yet another problem occurs when the traveler fails to notify the emergency contact individual that he or she has arrived safely at the destination. When this occurs, the emergency contact individual, believing that the traveler is in danger, may contact emergency response organizations for help in finding the traveler. This can create waste of an emergency response organization's resources and is inefficient.

Therefore, what is needed is a system and method for improving upon the problems with the prior art, and more particularly for a more efficient and cost-effective emergency response system.

BRIEF SUMMARY

Embodiments disclosed herein address deficiencies of the art in respect to emergency response systems. In one embodiment, a server application on a server is communicatively coupled to a communications network. The server application includes a receiving module for receiving a plurality of user information from a first mobile computing device. Such plurality of user information includes a user name, user contact information, a plan having an end time and plan location, an emergency contact name, emergency contact information and a list of estimated emergency services required by the user in case of an emergency. The server application further includes an initiation module for reading the plurality of user information, creating a user record, wherein each user record includes said user information, and storing the user record in an attached database.

The server application further includes a transmitting module for a) detecting the end time of the plan b) searching for and identifying the user record in the database, c) reading from the user record the user name and user contact information, d) generating a first message corresponding to user name and user contact information, e) sending, via the communications network, the first message to the user using the user contact information, f) waiting a first predetermined time to receive a response to the first message, g) receiving the response to the first message, and h) determining if a response to the first message was received within the first predetermined time.

The server application also includes a transmitting module for, if no response to the first message was received within the first predetermined time, a) reading from the user record the emergency contact name and emergency contact information, b) generating a second message corresponding to emergency contact name and emergency contact information, c) sending, via the communications network, the second message to said emergency contact using the emergency contact information, d) waiting a second predetermined time to receive a response to the second message, e) receiving the response to the second message, and f) determining if a response to the second message was received within the second predetermined time.

The server application also includes a transmitting module for, if no response to the second message was received within the second predetermined time, a) reading from the user record the plan location, b) searching for and identifying from a database having a plurality of emergency responder records, wherein each emergency responder record includes an emergency response organization, emergency response organization contact information, and a list of emergency services provided by each emergency response organization, an emergency response organization and emergency response contact information within a predefined area of the plan location and that corresponds to the estimated emergency services required by the user, c) generating a third message corresponding to the emergency response organization, d) sending, via the communications network, the third message to the emergency response organization using the emergency response contact information.

BRIEF DESCRIPTION OF THE SEVERAL VIEWS OF THE DRAWINGS

The accompanying drawings, which are incorporated in and constitute part of this specification, illustrate embodiments and together with the description, serve to explain the principles of the claimed subject matter. The embodiments illustrated herein are presently preferred, it being understood, however, that the claimed subject matter is not limited to the precise arrangements and instrumentalities shown, wherein:

DETAILED DESCRIPTION

The disclosed embodiments improve upon the problems with the prior art by providing a system and method for ensuring that an emergency response organization is promptly notified in case of an emergency when a person is overdue from a voyage or expedition. The system also provides a system for ensuring that the emergency response organization efficiently obtains the necessary information to conduct an efficient and appropriate rescue if necessary. The system further provides a system for notifying a user if such user forgets to inform an emergency contact that the user is not in danger. Lastly, the system also provides a method for activating a distress code or sending a distress signal when a triggering event happens, such as an impulse or a crash that was detected using an accelerometer, or such as the user moving outside of a geo-fence or other predefined area.

Figure 1:
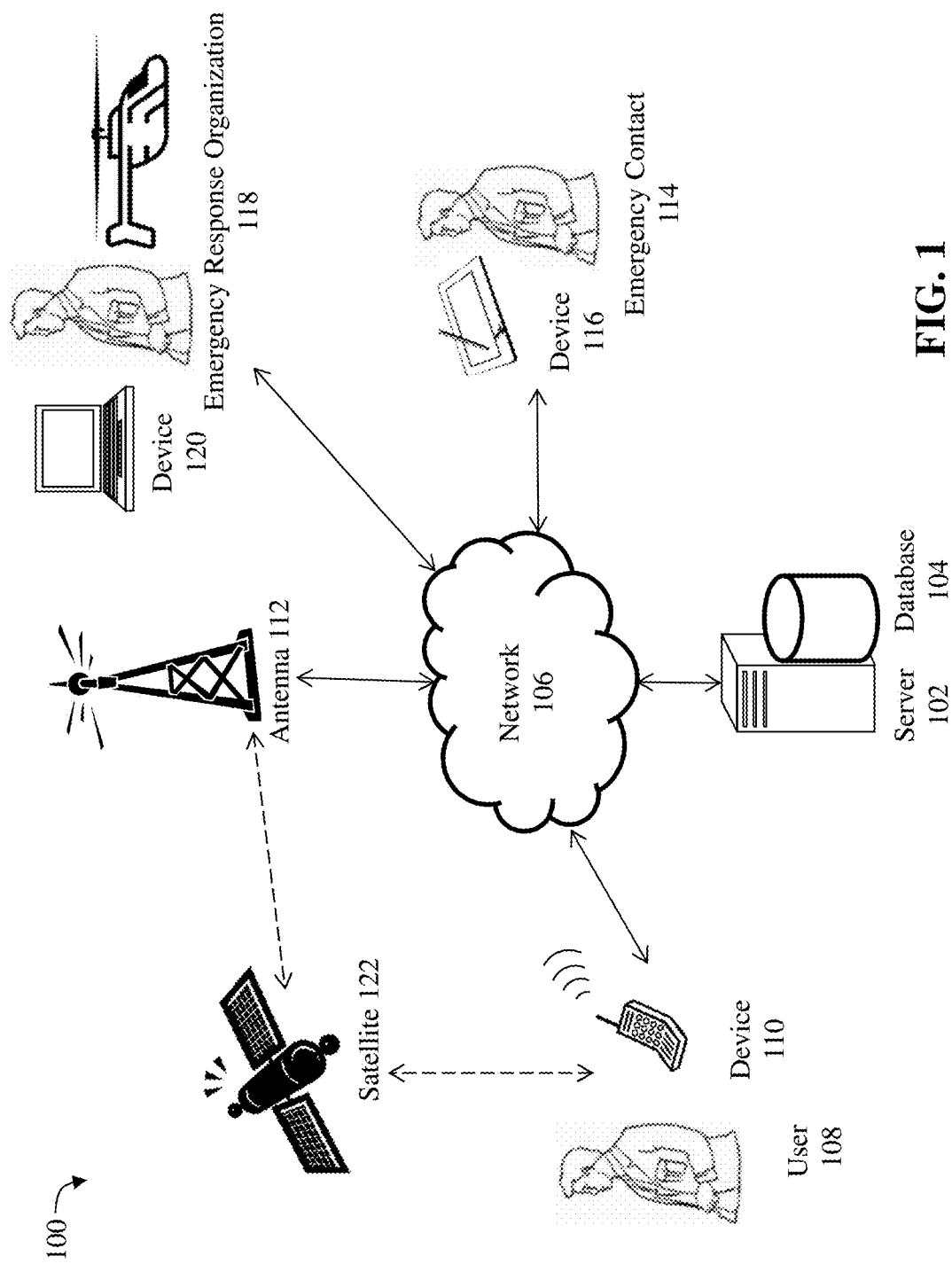
FIG. 1 is a diagram illustrating a network architecture for an emergency response system over a communications network, in accordance with one embodiment.

Referring now to the drawing figures in which like reference designators refer to like elements, there is shown in FIG. 1 an illustration of a block diagram 100 showing the network architecture for an emergency response system over a communications network. FIG. 1 shows an embodiment wherein user 108, emergency contact 114, emergency response organization 118, utilize their respective devices 110, 116, 120 to communicate with server 102 over a network 106, which can be a switched network, such as the Public Service Telephone Network (PSTN), or a packet-switched network, such as the Internet or the World Wide Web, the global telephone network, a cellular network, a mobile conditions network, or any combination of the above. It should be noted that each of the devices can be a desktop, a laptop, a handheld computer, a smart phone, a game console, a tablet computer would like. It should also be noted that user 108 may be traveling in remote locations that require a mobile device that is connected to the network 106 via a satellite 122 in communication with an antenna 112.

Server 102 may be a web server including a software engine that may delivers files, applications, image files, music files, video files, app files, machine readable code and other media content to the mobile computing devices. It should be noted that although FIG. 1 shows only three computing devices 110, 116, 120 and one web server 102, the system supports any number of computing devices and web servers connected via network 106. FIG. 1 further shows that web server 102 is connected to a database 104, which may store any data that is utilized by server 102 in the course of executing the disclosed embodiments.

Note that server 102 and its functionality, according to a preferred embodiment, can be realized in a centralized fashion in one computer system or in a distributed fashion where different elements are spread across several interconnected computer systems. Devices 110, 116, 120, satellite 122 and antenna 112 and servers 102 may each include program logic comprising computer source code, scripting language code or interpreted language code that perform various functions of the disclosed embodiments.

Figure 2:
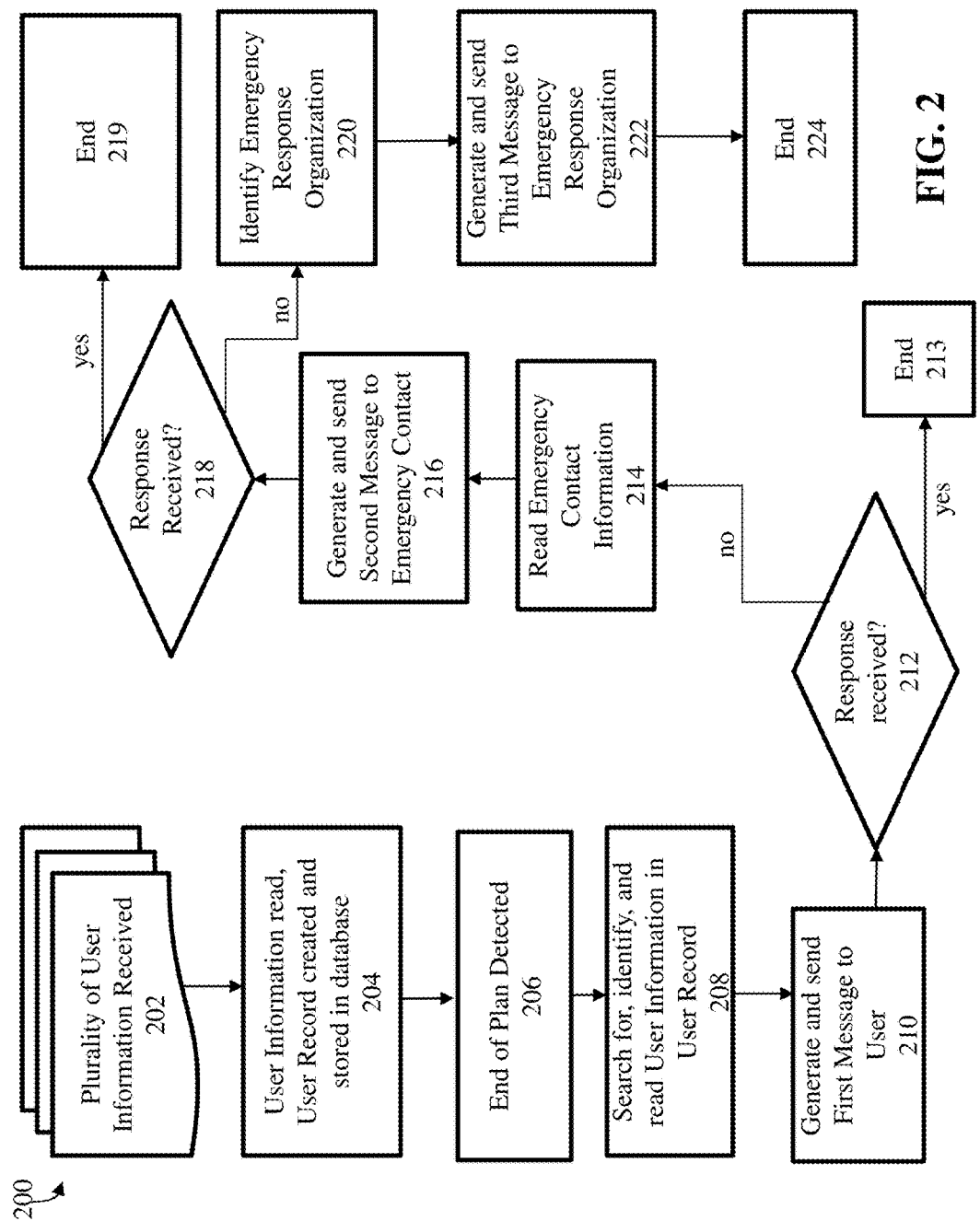
FIG. 2 is a block diagram illustrating the process flow for an emergency response system over a communications network, in accordance with one embodiment.
Figure 3:
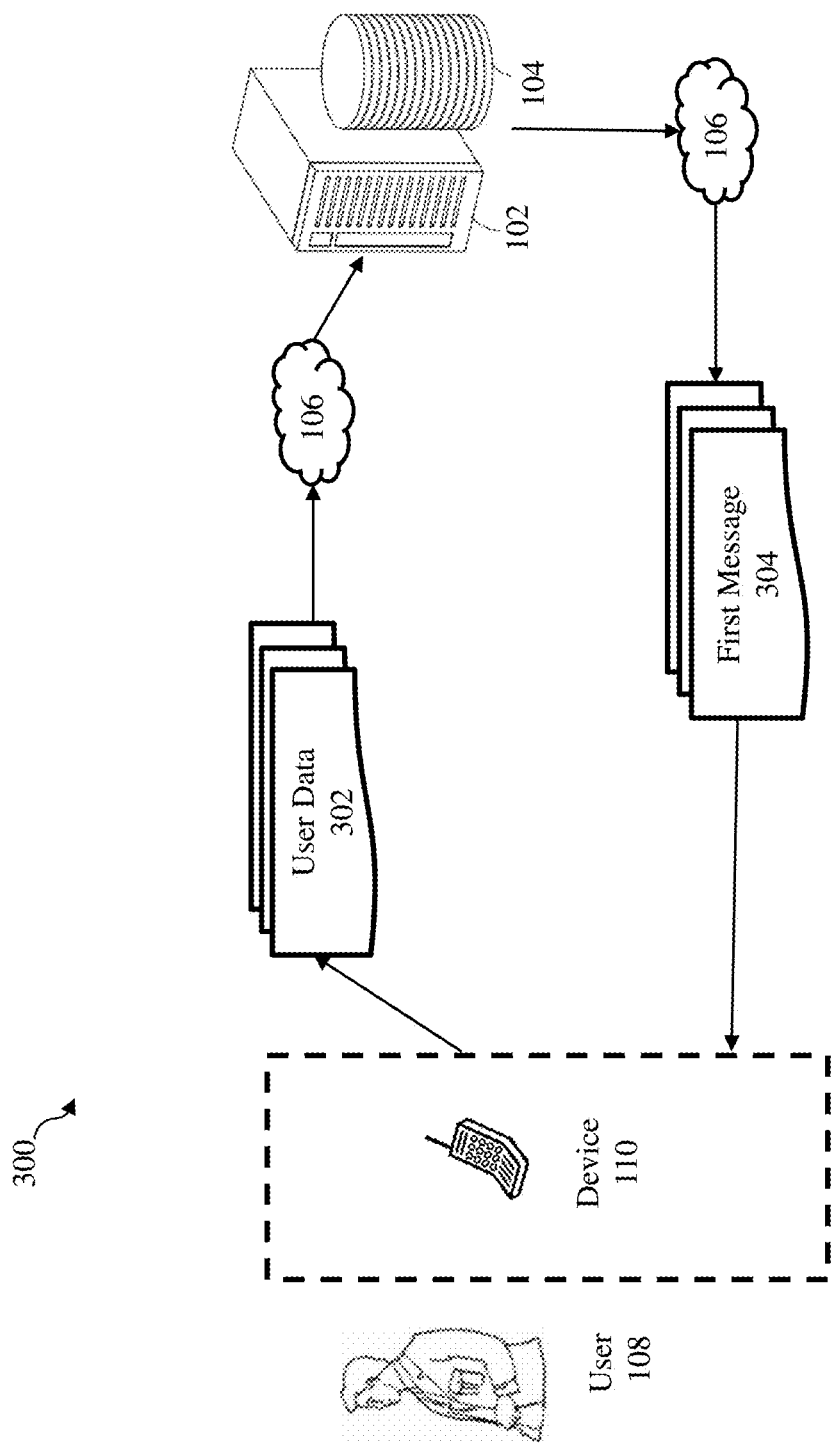
FIG. 3 is a block diagram illustrating the data flow for an emergency response system over a communications network, in accordance with one embodiment.

The process of the disclosed embodiments will now be described with reference to FIGS. 2 and 3, which depict the data and control flow for an emergency response system over a communications network, in accordance with one embodiment. The process begins with a user 108 executing a mobile application running on the mobile computing device 110, so as to input a plurality of user information 302 via a graphical user interface. The mobile computing device can be coupled to the communications network 106 through a satellite 122 that receives signals from the device and sends them to an antenna 112 that is coupled to the network.

Typically, a user will use the mobile application before going on a trip, expedition or voyage in a remote location. In case of an emergency, the user information can facilitate searching for and rescuing the user as well as to notify the friends and family that the user may be in danger. The plurality of user information 302 includes a username, user contact information, a plan having an end time and plan location, one or more emergency contact names, emergency contact information and a list of estimated emergency services required by the user in case of an emergency. In other cases, additional information and additional details regarding the user trip or plan may be included, including details regarding the route to be taken by the user, a route defined on a map, waypoints, names of streets, rivers, landmarks, etc. and names of businesses. The end time of the plan is the estimated date and time that a user intends the voyage or plan to be completed. For example, if a person is traveling in the woods, then the end time may be the expected day and time that the user expects to arrive at the destination.

Figure 5B:
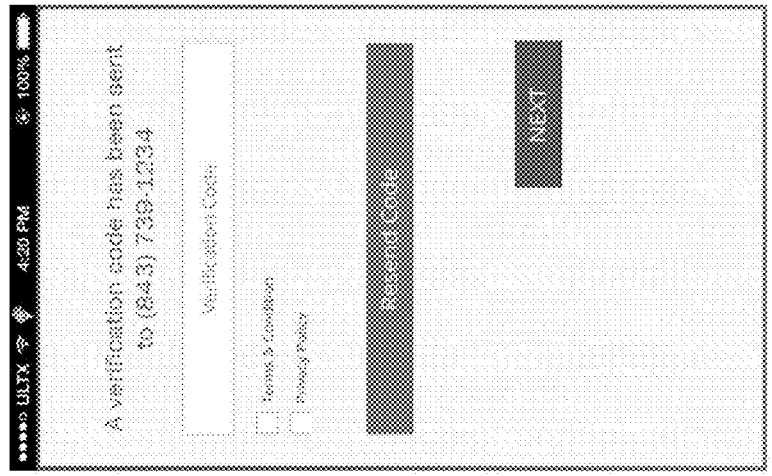
FIGS. 5A-5N are screenshots of graphical user interfaces utilized for an emergency response system according to an embodiment.
Figure 5A:
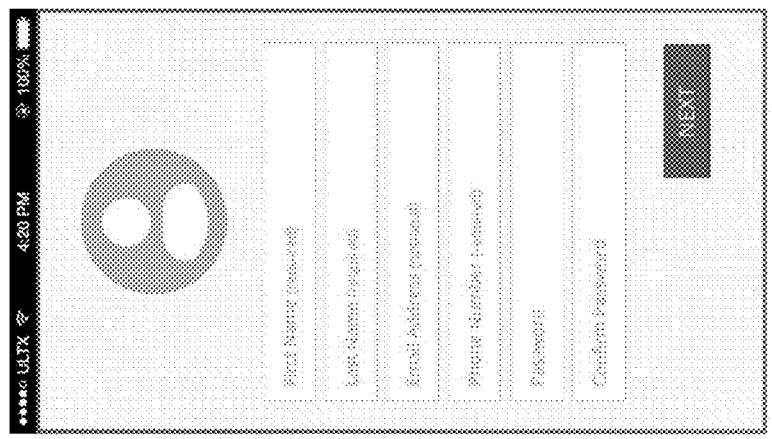
Figure 5D:
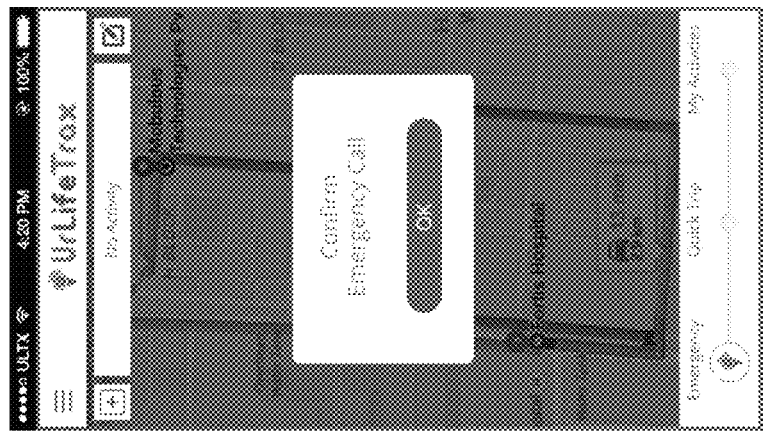
Figure 5C:
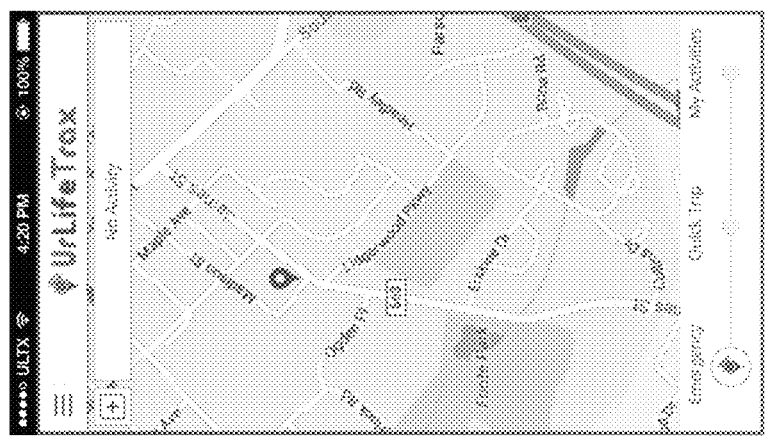
Figure 5E:
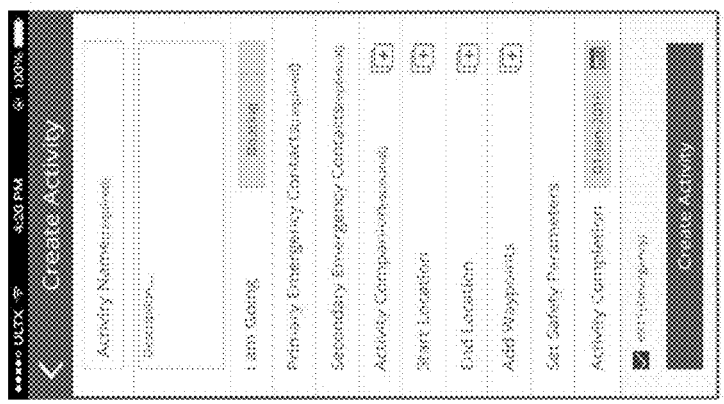
Figure 5G:
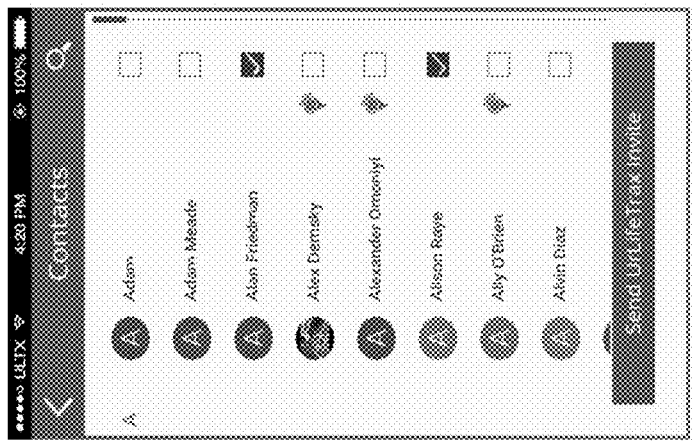
Figure 5F:
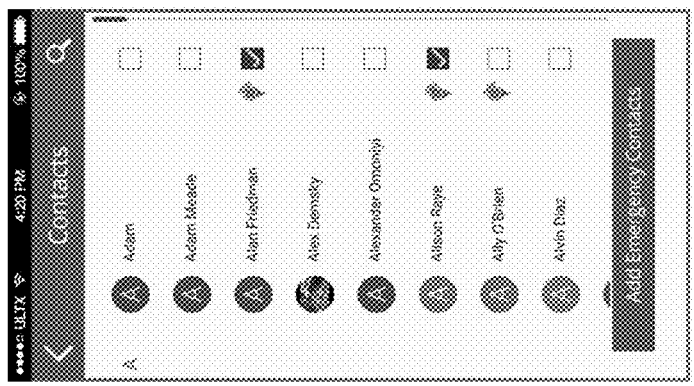
Figure 5I:
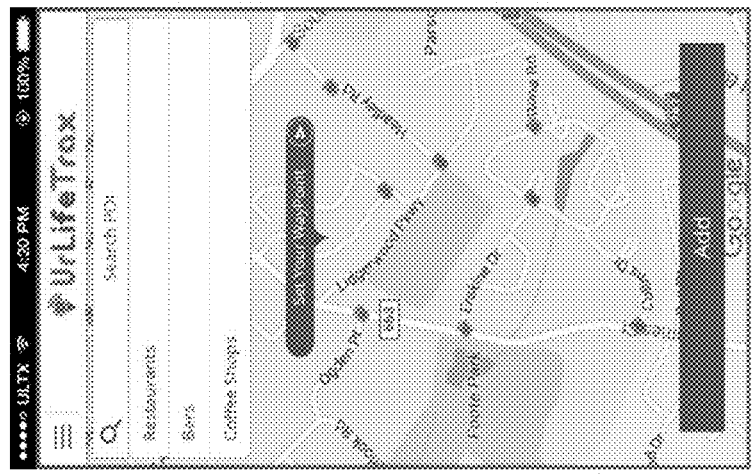
Figure 5H:
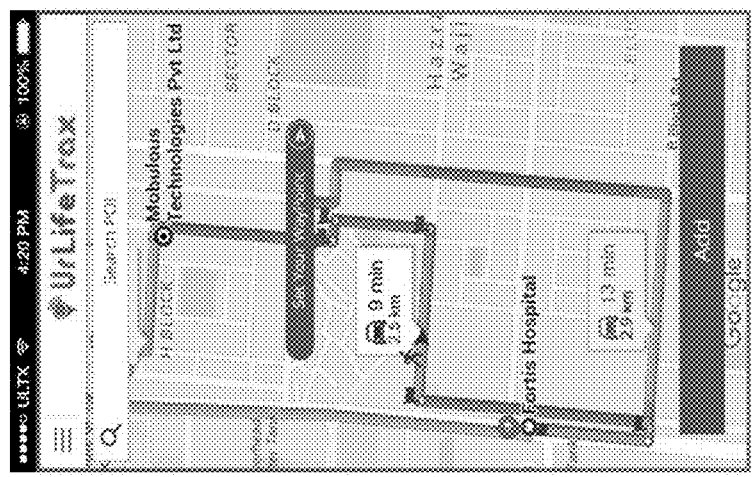
Figure 5K:
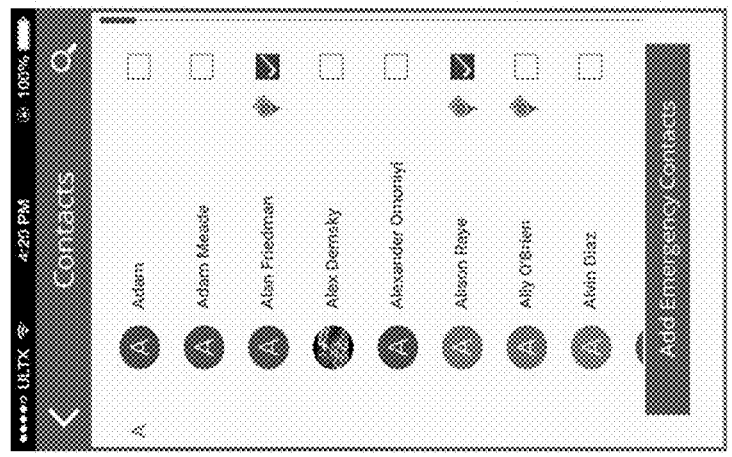
Figure 5J:
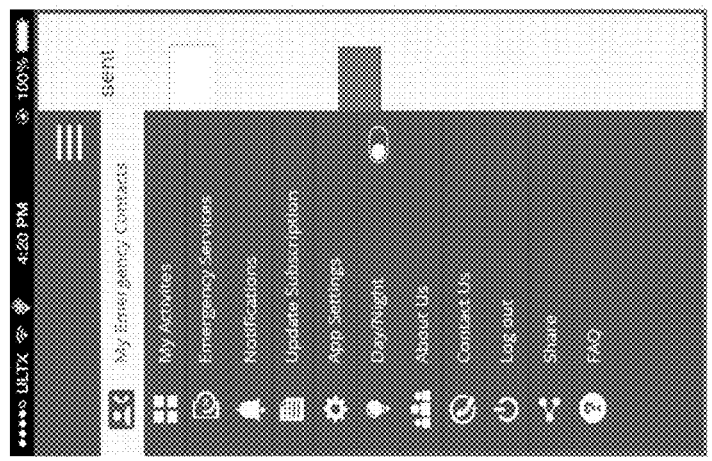
Figure 5L:
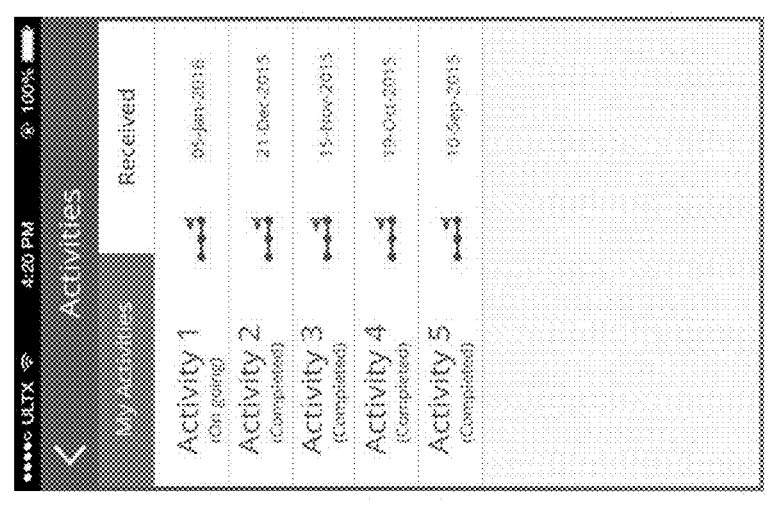
Figure 5N:
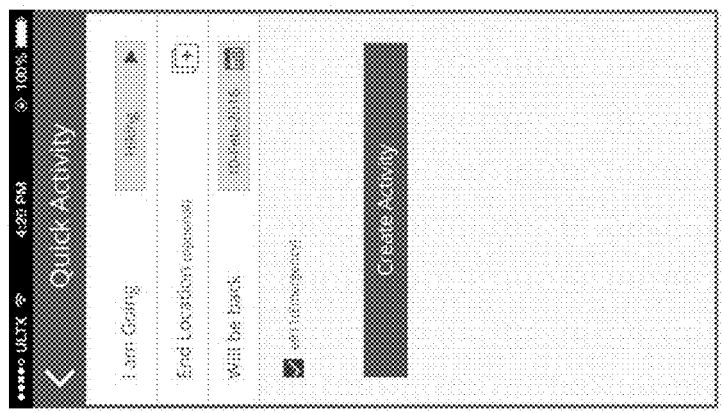

The graphical user interface (GUI) of FIG. 5A shows text fields where the user can enter his personal contact information and the GUI of FIG. 5B shows a process whereby the application sends a verification code to the user via text, for example, and wherein the user can then enter that verification code into the text field to verify that the application has logged the correct phone number. The GUI of FIG. 5E shows how the user can create a travel plan and define various attributes of the travel plan, and the GUI of FIG. 5N shows how the user can quickly create a new travel plan using a brief or truncated GUI. The GUI of FIG. 5F shows how the user can select emergency contacts from an already established list of contacts and the GUI of FIG. 5G shows a process whereby the user can press a button and send an invite to be an emergency contact to another person. The GUIs of FIGS. 5H and 5I show how the user can define a travel plan on a map and set waypoints along said travel plan for use by the application. The GUIs of FIGS. 5J and 5K show how the user can define one or more emergency contacts for use by the application. The GUI of FIG. 5L shows how the user can view various already defined travel plans and their current status.

Next, the initiation module on the device 108 sends the plurality of user information to the server 102. In step 202, a receiving module of a server application on the server receives the plurality of user information 302 from the first mobile computing device. In step 204, an initiation module of the server application then reads the plurality of user information and creates a user record. Each user record includes the user information. Next the user record is then stored in an attached database 104.

In step 206, a transmitting module of the server application then detects the end time of the plan. In step 208, the transmitting module then searches for and identifies the user record in the database. The user name and user contact information is then read from the user record in the database.

Figure 5M:
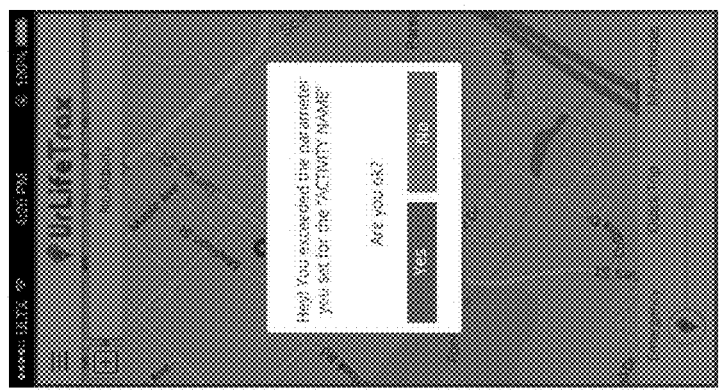

In step 210, the transmitting module generates a first message 304 to the user, which includes the username and user contact information, and sends it to the user device, such as 110. The message 304 requests that the user respond if the user has arrived safely at his or her destination. The GUI of FIG. 5M shows a GUI wherein the message 304 has been displayed on the screen of the user to determine whether he is safe and whether he needs help. In other embodiments, other requests or information prompting certain responses from the user may also be included. The transmitting module sends the first message to the user via the communications network 106, antenna 112 and satellite 122. The first message can be sent via HTTP or HTTPS.

In step 212, after the message 304 has been sent, the server application waits a first predetermined time to receive the user's response to the first message from the user (via network 106 or satellite 122). The response to the first message can be sent via HTTP or HTTPS and input via the graphical interface on mobile computing device 110. The predetermined time can be adjusted based upon various parameters including, location of trip, length of trip, characteristics of the user, characteristics of the location etc. In the present embodiment, if a response is received, the user has arrived safely at the destination and no further action is needed and the application ends at step 213. However, if no response is received by the server application within the first predetermined time, then the process flow moves to step 214.

In step 214, the transmitting module of the server application reads the emergency contact name and emergency contact information from the user record. An emergency contact may include a family member or friend that could be available to notify authorities to let the authorities or emergency response organizations know that no contact has been made with the user and that the user may be in danger.

In step 216, the transmitting module then generates a second message to the emergency contact and sends the second message to the emergency contact information via the communications network 106. The second message may be in HTTP or HTTPS. The second message may include a request that the emergency contact respond within a second predetermined time to inform the server application if the user has arrived safely at his or her destination. The second message may also include additional instructions or information that may require a response from the emergency contact. Such additional instructions may include instructions for contacting the authorities or emergency response organizations as well a list of estimated emergency services required by the user in case of an emergency. The emergency contact may enter a response on device 116 using a graphical interface attached thereto.

In step 218, the server application waits for a second predetermined time for a response to the second message from the emergency contact. If the emergency contact does respond, such response is sent via the communications network 106 to the server application, and then the process flow moves to step 219 where the server application process ends. If no response is received, then the process flow moves to step 220.

In step 220, a transmitting module of the server application reads from the user record the plan location. A database attached to the server includes a plurality of emergency responder records. Each emergency responder record includes an emergency response organization, emergency response organization contact information, and a list of emergency services provided by each emergency response organization. The transmitting module of the server application searches the database and identifies an emergency response organization and emergency response contact information within a predefined area of the plan location and that corresponds to the estimated emergency services required by the user.

Next, in step 222, the server application generates a third message corresponding to the emergency response organization and sends the third message, via the communications network, to appropriate emergency response organization using the emergency response contact information. The third message can include the user name, user contact information, plan, emergency contact name, emergency contact information, and estimated emergency services required by the user.

In one alternative embodiment, the sequence of steps that leads to the messages being sent in steps 210, 216 and 222 may be prompted instead by the detection of an event. In one embodiment, an accelerometer, as well as other sensors on the device 110, for example, may detect that an accident has occurred when an impulse or crash has been detected, which may prompt the messages of steps 210, 216 and 222 being sent. In another embodiment, a user may press a button or interact with a GUI on the device 110, which may result in a distress signal being sent via network 106 of satellite 122, which may prompt the messages of steps 210, 216 and 222 being sent. In another embodiment, a user may move outside of a geo-fence or other predefined area (defined by his travel plan previously), which may result in the messages of steps 210, 216 and 222 being sent.

While certain embodiments have been described, other embodiments may exist. Embodiments have been described as being associated with data stored in memory and other storage mediums, data can also be stored on or read from other types of computer—readable media, such as secondary storage devices, like hard disks, floppy disks, or a CD-ROM, or other forms of RAM or ROM. Additionally, the disclosed methods' stages may be modified in any manner, including by reordering stages and/or inserting or deleting stages, without departing from the claimed subject matter.

Figure 4:
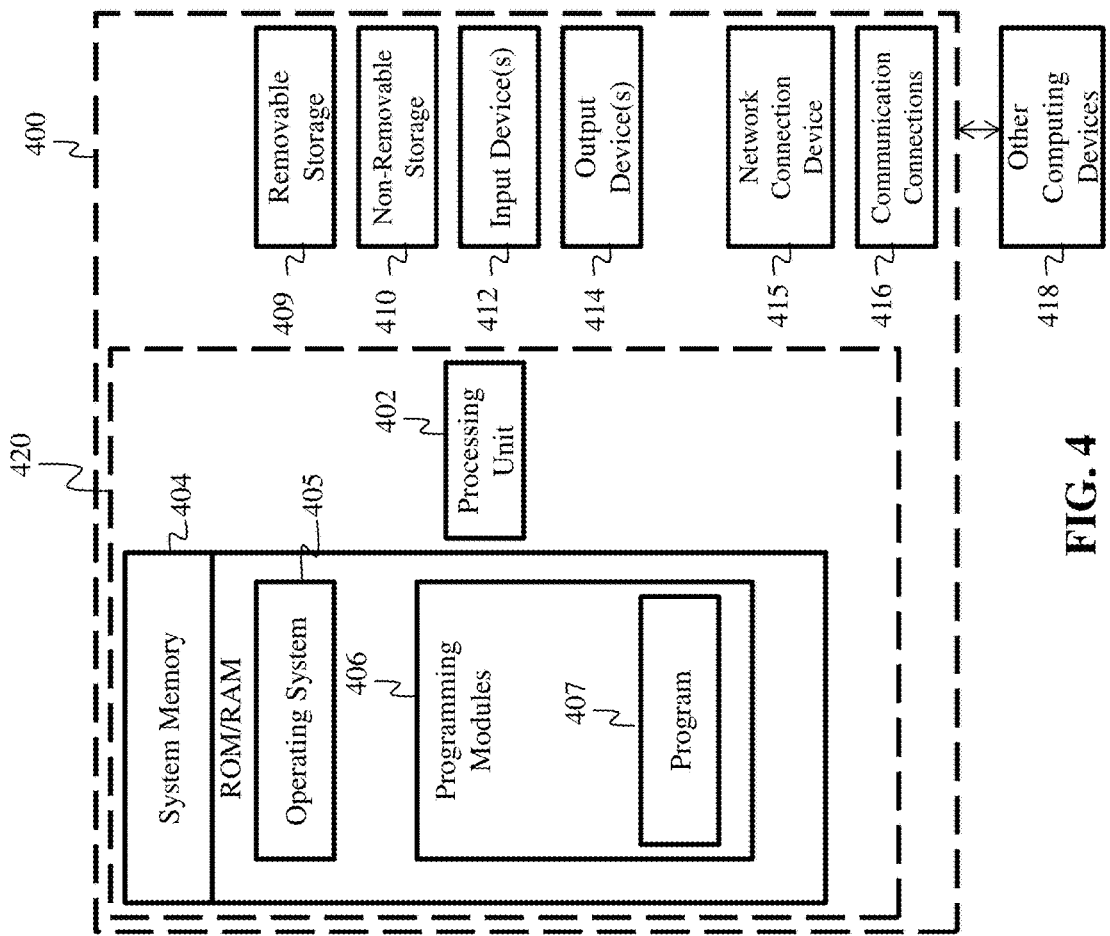
FIG. 4 is a block diagram of a system including a computing device, according to an example embodiment.

FIG. 4 is a block diagram of a system including an example computing device 400 and other computing devices. Consistent with the embodiments described herein, the aforementioned actions performed by server 102, devices 120, 116, 110 may be implemented in a computing device, such as the computing device 400 of FIG. 4. Any suitable combination of hardware, software, or firmware may be used to implement the computing device 400. The aforementioned system, device, and processors are examples and other systems, devices, and processors may comprise the aforementioned computing device. Furthermore, computing device 400 may comprise an operating environment for system 100 and processes 200, 300, as described above. Processes 200, 300 may operate in other environments and are not limited to computing device 400.

With reference to FIG. 4, a system, in one embodiment, may include a plurality of computing devices, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination or memory. System memory 404 may include operating system 405, and one or more programming modules 406. Operating system 405, for example, may be suitable for controlling computing device 400's operation. In one embodiment, programming modules 406 may include, for example, a program module 407 for executing the actions of server 102, devices 120, 116, 110. Furthermore, embodiments may be practiced in conjunction with a graphics library, other operating systems, or any other application program and is not limited to any particular application or system. This basic configuration is illustrated in FIG. 4 by those components within a dashed line 420.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a camera, a touch input device, etc. Output device(s) 414 such as a display, speakers, a printer, etc. may also be included. Computing device 400 may also include a vibration device capable of initiating a vibration in the device on command, such as a mechanical vibrator or a vibrating alert motor. The aforementioned devices are only examples, and other devices may be added or substituted.

Computing device 400 may also contain a network connection device 415 that may allow device 400 to communicate with other computing devices 418, such as over a network in a distributed computing environment, for example, an intranet or the Internet. Device 415 may be a wired or wireless network interface controller, a network interface card, a network interface device, a network adapter or a LAN adapter. Device 415 allows for a communication connection 416 for communicating with other computing devices 418. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 404, including operating system 405. While executing on processing unit 402, programming modules 406 (e.g. program module 407) may perform processes including, for example, one or more of the stages of the processes 200, 300 as described above. The aforementioned processes are examples, and processing unit 402 may perform other processes. Other programming modules that may be used may include electronic mail and contacts applications, word processing applications, spreadsheet applications, database applications, slide presentation applications, drawing or computer-aided application programs, etc.

Generally, program modules may include routines, programs, components, data structures, and other types of structures that may perform particular tasks or that may implement particular abstract data types. Moreover, embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Furthermore, embodiments may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments may also be practiced using other technologies capable of performing logical operations such as, for example, AND, OR, and NOT, including but not limited to mechanical, optical, fluidic, and quantum technologies. In addition, embodiments may be practiced within a general purpose computer or in any other circuits or systems.

Embodiments, for example, are described above with reference to block diagrams and/or operational illustrations of methods, systems, and computer program products. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Although specific embodiments have been disclosed, those having ordinary skill in the art will understand that changes can be made to the specific embodiments without departing from the spirit and scope of the claimed subject matter. The scope of the claimed subject matter is not to be restricted, therefore, to the specific embodiments. Furthermore, it is intended that the appended claims cover any and all such applications, modifications, and embodiments within the scope of the claimed subject matter.

What is claimed is:

1. A system for facilitating an emergency response, comprising:
a server application on a server comprising a processor and a memory, the server communicatively coupled to a communications network, comprising:
a receiving module configured for receiving a plurality of user information from a first mobile computing device, wherein the plurality of user information includes a user name, user contact information, a plan having an end time and plan location, an emergency contact name, emergency contact information and a list of estimated emergency services required by the user in case of an emergency;
an initiation module configured for reading the plurality of user information, creating a user record, wherein each user record includes said user information, and storing the user record in an attached database;
a transmitting module configured for a) detecting the end time of the plan, b) searching for and identifying the user record in the database, c) reading from the user record the user name and user contact information, d) generating a first message corresponding to user name and user contact information, e) sending, via the communications network, the first message to the user using the user contact information, f) waiting a first predetermined time to receive a response to the first message, g) determining that a response to the first message was not received within the first predetermined time; h) reading from the user record the emergency contact name and emergency contact information, i) generating a second message corresponding to emergency contact name and emergency contact information, j) sending, via the communications network, the second message to said emergency contact using the emergency contact information;
a mobile application on the first mobile computing device communicatively coupled to the communications network, comprising:
a graphical user interface for receiving input from a user of the mobile application;
an initiation module for sending a plurality of user information, input by the user via the graphical user interface, to the server over the communications network, wherein the plurality of user information includes the user name, user contact information, the plan having the plan location and the end time, the emergency contact name, emergency contact information, and the list of estimated emergency services required by the user in case of an emergency;
a receiving module for receiving a message sent from the server over the communications network and displaying the message in the graphical user interface of the first mobile computing device; and
a transmitting module configured for a) sending a response to the message from the server, wherein the response is input by the user via the graphical user interface, and wherein the response is sent over the communications network; b) transmitting accelerometer sensor data to the server; c) generating geofencing data and sending said geofencing data to the server; and d) sending a distress signal to the server, wherein the distress signal is input by the user via the graphical user interface, and wherein the distress signal is sent over the communications network.

2. The system of claim 1, wherein the transmitting module of the server application is further configured for:
a) waiting a second predetermined time to receive a response to the second message, b) determining that a response to the second message was not received within the second predetermined time; c) reading from the user record the plan location, d) searching for and identifying from a database having a plurality of emergency responder records, wherein each emergency responder record includes an emergency response organization, emergency response organization contact information, and a list of emergency services provided by each emergency response organization, an emergency response organization and emergency response contact information within a predefined area of the plan location and that corresponds to the estimated emergency services required by the user, e) generating a third message corresponding to the emergency response organization, f) sending, via the communications network, the third message to the emergency response organization using the emergency response contact information.

3. The system of claim 2, wherein the receiving module of the server application receives the plurality of user information via HTTP or HTTPS.

4. The system of claim 2, wherein the transmitting module of the server application sends the first message and receives a response to the first message via HTTP or HTTPS.

5. The system of claim 2, wherein the transmitting module of the server application sends the second message and receives a response to the second message via HTTP or HTTPS.

6. The system of claim 2, wherein the transmitting module of the server application sends the third message via HTTP or HTTPS.

7. The system of claim 2, wherein the plan further includes a route having a plurality of details of the route.

8. The system of claim 7, wherein the third message includes the user name, user contact information, plan, emergency contact name, emergency contact information, and estimated emergency services required by the user.

9. The system of claim 2, wherein the first message includes a request that the user respond within the first predetermined time.

10. The system of claim 2, wherein the second message includes a request that the emergency contact respond within the second predetermined time.

11. A system for facilitating an emergency response, comprising:
a server application on a server comprising a processor and a memory, the server communicatively coupled to a communications network, comprising:
a receiving module configured for receiving a plurality of user information from a first mobile computing device, wherein the plurality of user information includes user contact information, a plan having an end time, emergency contact information and a list of emergency services for use in case of an emergency;
an initiation module configured for reading the plurality of user information, creating a user record, wherein each user record includes said user information, and storing the user record in an attached database; and
a transmitting module configured for a) detecting the end time of the plan, b) searching for and identifying the user record in the database, c) reading from the user record the user contact information, d) generating a first message corresponding to the user contact information, e) sending, via the communications network, the first message to the user using the user contact information, f) waiting a first predetermined time to receive a response to the first message, g) determining that a response to the first message was not received within the first predetermined time; h) reading from the user record the emergency contact information, i) generating a second message corresponding to the emergency contact information, j) sending, via the communications network, the second message using the emergency contact information;

a mobile application on the first mobile computing device communicatively coupled to the communications network, comprising:

a graphical user interface for receiving input from a user of the mobile application;

an initiation module for sending a plurality of user information, input by the user via the graphical user interface, to the server over the communications network, wherein the plurality of user information includes the user name, user contact information, the plan having the plan location and the end time, the emergency contact name, emergency contact information, and the list of estimated emergency services required by the user in case of an emergency;

a receiving module for receiving a message sent from the server over the communications network and displaying the message in the graphical user interface of the first mobile computing device; and a transmitting module for a) sending a response to the message from the server, wherein the response is input by the user via the graphical user interface, and wherein the response is sent over the communications network; b) transmitting accelerometer sensor data to the server; c) generating geofencing data and sending said geofencing data to the server; and d) sending a distress signal to the server, wherein the distress signal is input by the user via the graphical user interface, and wherein the distress signal is sent over the communications network.

12. The system of claim 11, wherein the receiving module of the server application receives the plurality of user information via HTTP or HTTPS.

\* \* \* \* \*